Oct. 25, 1966  D. S. CHISHOLM ET AL  3,280,847
EXTRUSION DIE

Filed Sept. 19, 1961  2 Sheets-Sheet 1

INVENTORS
Douglas S. Chisholm
and John J. Grebe
By
Stephen J. Rudy
Jerome Rudy  att'ys Oct. 25, 1966  D. S. CHISHOLM ETAL  3,280,847
EXTRUSION DIE
Filed Sept. 19, 1961  2 Sheets-Sheet 2
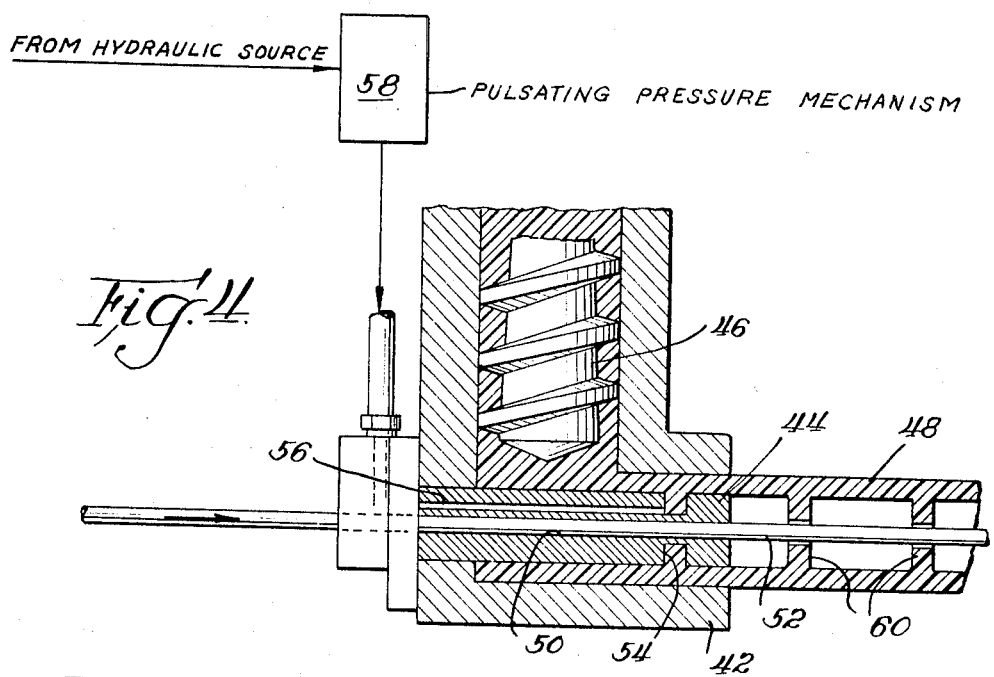
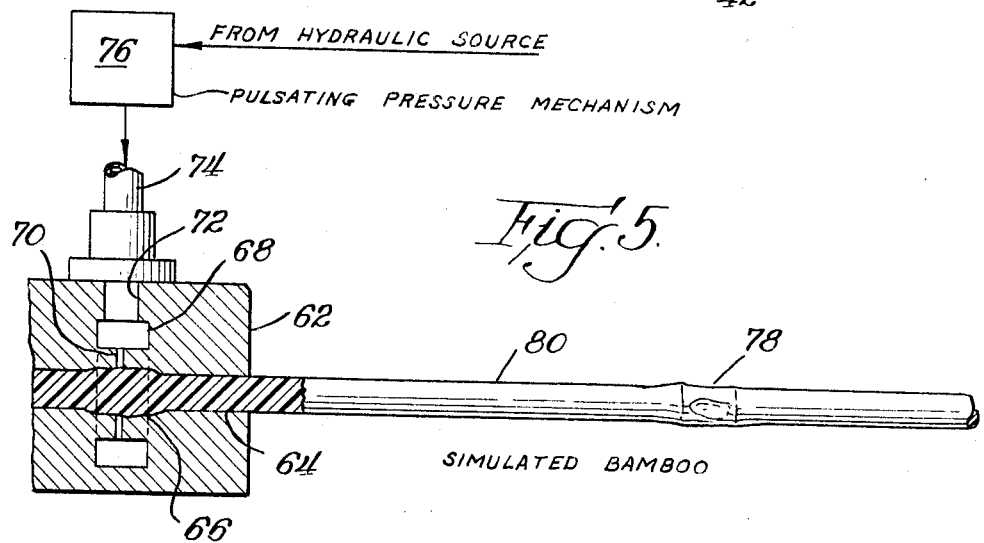
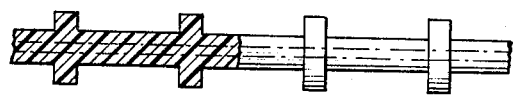
INVENTORS
Douglas S. Chisholm
and John J. Grebe

United States Patent Office 3,280,847
Patented Oct. 25, 1966

3,280,847
EXTRUSION DIE
Douglas S. Chisholm and John J. Grebe, Midland, Mich., assignors to The Dow Chemical Company, Midland, Mich., a corporation of Delaware
Filed Sept. 19, 1961, Ser. No. 139,111
15 Claims. (Cl. 138—121)

This invention relates to a method and apparatus for forming repetitive protuberances upon one or more surfaces of plastic material being extruded from an extrusion die, and an extruded product made in accordance with the principles of the invention.

Briefly, the inventive concept for producing repetitive protuberances upon the surface of an extrudate, provides for the forming of a groove, or recess, upon the extruding surface of a die which groove, or recess, is a replica of the pattern of the protuberances, and which extends generally transverse to the flow direction of extrudate. A passageway means is arranged to connect the groove with a source of pulsating hydrostatic pressure. The pressurized fluid may be water containing a wetting agent, although other fluids may be employed as long as they are immiscible with the plastic being extruded. In operation, after extrusion is started, water is pumped into the groove until all gases entrapped between the groove and extrudate have been vented out through the die extruding opening. The hydrostatic pressure is then caused to fluctuate above and below the extrusion pressure at the groove, whereupon the desired protuberant design appears on the surface of the extrudate as it emerges from the extrusion die.

A variety of extrudate forms may be fabricated, such as a flat sheet, a rod, a tape, or a tube, and the protuberant design may be arranged on one or more surfaces thereof. In addition, a conducting wire may be inserted in a tube as it is extruded, while tube will be provided with inwardly directed integral discs (standoff insulators) for supporting the wire in the tube.

The main object of this invention is to provide a method and apparatus for producing repetitive protuberances upon the surface of a plastic extrudate as it emerges from an extruding die.

Another object is to provide a method and apparatus for producing repetitive protuberances upon extrudate which may be in the form of a flat sheet, a rod, a tape or a tube.

Still another object of the invention is to provide a method and apparatus for producing repetitive protuberances on either, or both surfaces of extrudate emerging from an extruding die.

Another object is to provide a method and apparatus for producing an extruded tube having a conducting wire therein, which wire is supported by discs formed integrally with the tube.

Still another object is to provide a method and apparatus for producing an extrudate having protuberances forming a repetitive design on one or more surfaces, which method and apparatus are extremely simple in operation and design, and which may be used in automatic and high volume production.

These and further objects and features of the invention will become more apparent from the following description and accompanying drawing wherein:

FIG. 4 is a generally schematic illustration of a modified type of apparatus embodying the principles of the invention;

FIG. 5 is a generally schematic illustration of still another modified type of apparatus embodying the principles of the invention; and FIG. 6 is an illustration of an elongated cylindrical extrudate having a series of equally spaced disc-like flanges formed integral with and projecting outwardly from the extrudate.

Figure 1:
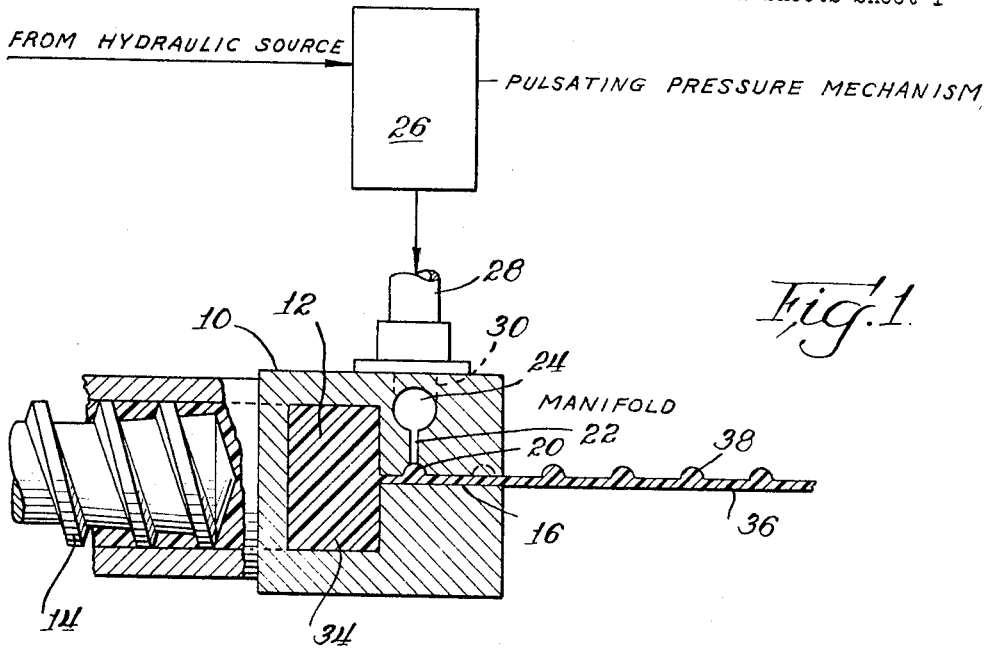
FIG. 1 is a generally schematic illustration of apparatus embodying the principles of the invention.

Referring now to the drawings, and more particularly to FIG. 1, an extruder head 10, which is generally rectangular in horizontal cross-section, is provided with a cavity 12 for receipt of plastic material delivered thereto under pressure by an extruding screw 14, forming part of an extruder (not shown). An elongated slot 16, formed in a forward wall 18 of the extruder head 10, is adapted to provide extrusion of plastic material from the cavity 12 in sheet form. A groove, or recess, 20 is formed in that portion of the extruder head defining the upper surface of the slot 16, which groove, traverses the full length of the slot. A vertical slot 22 connects the groove 20 to a horizontally arranged passageway 24 forming a manifold within the extruder head.

The manifold 24 and slot 22 arrangement is utilized for application of a pulsating hydrostatic pressure to the groove 20. Toward this end, a pulsating pressure mechanism 26, connected to a source of hydraulic fluid (not shown), is adapted to subject the manifold 24 to a pulsating hydrostatic pressure via a pipe 28 connected to the extruder head 10. A passageway means 30, formed in the extruder head, is arranged for connecting the pipe 28 with the manifold 24.

Figure 2:
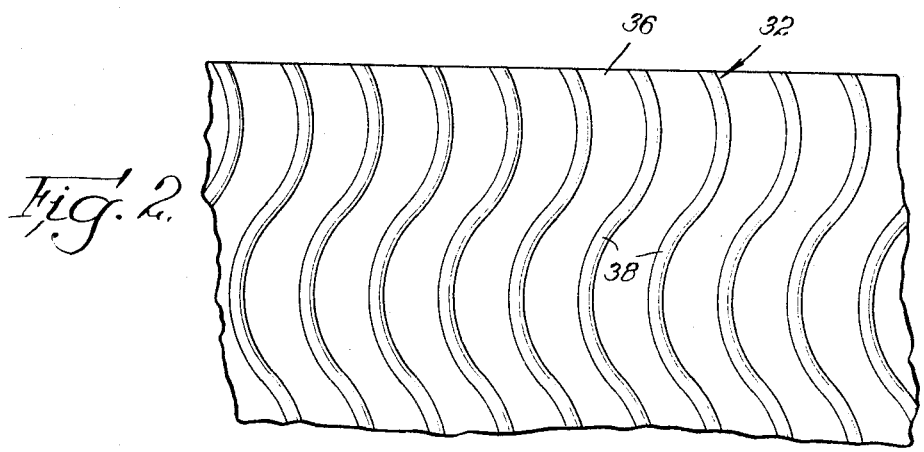
FIG. 2 is a plan view illustrating a pattern formed upon extrudate produced by the apparatus shown in FIG. 1.

The groove 20 may be of any desired configuration, i.e., straight, or curved, as illustrated by the pattern 32 depicted in FIG. 2.

In operating the above disclosed apparatus to form repetitive protuberances on a flat sheet of plastic extrudate, it will be seen that plastic material 34 forced into the cavity 12 will be extruded through the slot 16 to form a flat sheet 36. Hydraulic fluid, such as water, is pumped into the groove 20 until all of the gases entrapped between the groove and the extrudate are vented out of the extruder head 10, via the slot 16. Hydrostatic pressure is then caused to fluctuate above and below the extrusion pressure at the groove, whereupon a design identical with the configuration of the groove 20, will be formed on the surface of the extrudate 36.

When the hydrostatic pressure falls below the pressure on the plastic material in the slot 16, the plastic material will fill the groove 20 to form a protuberance 38, of the same shape as the groove 20. Subsequently, when hydrostatic pressure is suddenly raised above the pressure of the plastic material, by action of the pulsating pressure mechanism 26, the protuberance formed in the groove 20, will be forced out of the groove and will pass out of the extruder head slot 16 along with the flat extrudate 36. Upon leaving the extruder head 10, plastic memory will operate to cause a protuberance to reassume the form and general position it occupied relative to the flat sheet 36, when it was initially molded in the groove 20. Extrusion of the flat sheet 36 is not intermittent; only the application of the hydraulic pressure is intermittent. The frequency of the hydraulic pressure pulsation determines the frequency of the protuberances formed on the extrudate for any rate of extrusion.

Figure 3:
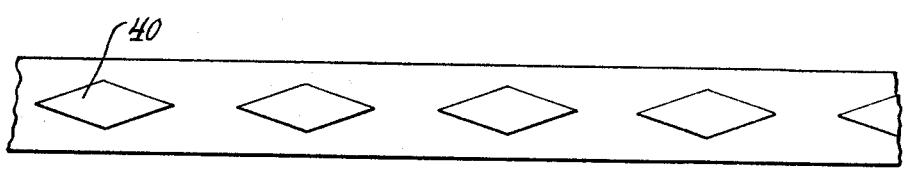
FIG. 3 is a plan view of another pattern formed upon extrudate produced by apparatus of the type shown in FIG. 1.

It will be apparent that almost any design of protuberance pattern may be fashioned by forming the required groove in a surface of the walls of the slot 16. In addition to the curved pattern 32 shown, a series of individual protuberances, such as diamond shapes 40, as illustrated in FIG. 3, may be produced on a tape. Furthermore, if desired, both of the walls of the slot 16 may be grooved, and exposed to pulsating hydrostatic pressure, to form protuberances on both sides of a flat sheet being extruded.

The principles of the invention may be applied to form an insulated wire arrangement wherein a wire is supported in a series of annular discs, or "standoff insulators," projecting inwardly within a plastic tube. Apparatus to produce such a product is illustrated in FIG. 4, and includes a cylindrical extrusion die 42, having a mandrel 44 coaxially arranged therein and uniformly spaced from the inner circular wall of the die. An extruder screw 46 is arranged for forcing plastic material into the die 42 from whence it will be extruded in a tubular form 48. The mandrel 44 is formed to provide an axially arranged passageway 50 through which a wire 42 may be moved at substantially the same rate as the tube 48 is being extruded. A peripheral groove, or recess, 54 is formed upon the mandrel near the end, which groove may be filled by a given quantity of plastic material being forced out of the die 42. A passageway 56 in the mandrel connects the groove 54 with a pulsating pressure mechanism 58, which receives hydraulic liquid from a source (not shown) and delivers it to the groove 54 in pulses of regulated time frequency and intensity.

The operation of the apparatus described in connection with FIG. 4, is similar to that described in connection with FIG. 1. Plastic material being extruded from the die 42, will flow into the groove 54 to form a disc 60 which will be forced from the groove 54 by hydraulic pressure applied upon the material in the groove via passageway 56. Upon leaving the extrusion die 42, plastic memory will operate to cause the disc 60 to reassume the general position and form it occupied when it was molded in the groove 54. The integrally formed and inwardly projecting discs 60 thus produced will serve to support the wire 52 axially within the tube 48.

Another modification embodying the principles of the invention is illustrated in FIG. 5. An extrusion die 62 is provided with an axial passageway 64 the wall of which may be striated to simulate the appearance of a bamboo stalk. An enlargement, or recess, 66 formed in the passageway, may be provided to simulate a nodule of the type associated with a bamboo stalk. Surrounding the enlargement 66 is a circular cavity 68 which is connected to the enlargement by a circular slot 70. Hydraulic fluid is conducted to the cavity 68 via a passageway 72 formed in the extrusion die 62. A pipe means 74 connects the passageway 72 with a pulsating pressure mechanism 76, which is served by an hydraulic liquid source (not shown).

In operation, a series of spaced nodules 78 are formed on a rod-like extrudate 80 emerging from the die 60. The nodules are forced from the enlargement 66 by hydraulic pressure applied under conditions of regulated intensity, and timed sequence, as in the case of the previously disclosed embodiments. Shapes other than that described in connection with FIG. 5, may of course be produced by utilizing the principles of the invention. For example, a cylindrical body (solid or hollow) may be extruded having a series of disc-like flanges extending from the outer surface, as seen in FIG. 6. Apparatus for production of such an extrudate may take the form of the apparatus shown in FIG. 5.

The type of plastic material useable in application of the method of the invention, can be any type which may be extruded, such as normally solid polyolefins, particularly polyethylene, polypropylene, copolymers of ethylene and propylene and the like, polystyrene and nylon. As previously mentioned, liquids other than water may be used for forcing the plastic material out of the recesses 20, 54 and 66, as long as it is not a solvent for the extrudate.

It will be apparent that the embodiments disclosed will satisfy all of the objectives of the invention as set forth hereinbefore.

The foregoing description has been given in detail without thought of limitation since the inventive principles involved are capable of assuming other forms without departing from the spirit of the invention or the scope of the following claims.

What is claimed is:

1. A method for producing repetitive protrusions formed through plastic memory on extrudate comprising the steps of, forcing extrudable material in a given direction along a semi-confining path, allowing some of the material to flow into a recess adjacent to and in communication with said path, and applying a positive force to move the material out of said recess at periodic intervals.

2. A method according to claim 1, wherein said positive force comprises hydrostatic pressure which fluctuates above and below the pressure of the extrudable material while it is in said semi-confining path.

3. Apparatus for extruding plastic material with a protrusion formed through plastic memory on a surface of the extrudate comprising, a die means formed to provide an opening through which plastic material may be extruded, said die means being further formed to provide a recess in a wall surface near said opening, and passageway means in the die for conducting a pressure fluid to said recess.

4. Apparatus of claim 3 wherein said recess has the shape of the protrusion to be formed on a surface of the extrudate and extending generally transverse to the flow direction of the extrudate, and passageway means in the die for conducting a pressure fluid to said recess.

5. Apparatus for extruding plastic material with a repetitive pattern of protuberances formed through plastic memory on the surface of the extrudate comprising, an extruding die formed to provide an elongated slot and being further formed to provide a cavity for receipt of pressurized plastic material, said cavity being arranged to open into said slot, and a recess formed in a surface of said slot which recess is substantially equal to the length of said slot, said extruding die being formed to provide a passageway for conduction of pressurized medium to said recess.

6. Apparatus according to claim 5 wherein a mechanism is arranged to provide a pulsating hydraulic pressure to said recess as the plastic material is forced through the slot.

7. Apparatus for extruding plastic material in tubular form having a series of inwardly directed discs therein formed through plastic memory comprising, a cylindrical extrusion die, and a mandrel coaxially arranged therein and uniformly spaced from an inner circular wall of the die, said mandrel being formed to provide a peripheral groove near its end which groove may be filled by a given quantity of plastic material being forced out of the die, said mandrel being further formed to provide a passageway whereby pressurized medium may be directed to said groove to force plastic material therefrom.

8. Apparatus according to claim 7, wherein said mandrel is formed to provide an axially arranged passageway through which a conducting wire may be moved through the mandrel in timed relation with the tubular form being extruded.

9. Apparatus according to claim 7, wherein a pulsating pressure mechanism is arranged to provide a pulsating hydraulic pressure to said groove as the plastic material is being extruded from the die.

10. A continuous extrudate having integral repetitive protuberances formed on its surface through plastic memory.

11. A continuous plastic extruded sheet having integral repetitive protuberances formed on its surface through plastic memory.

12. A continuous plastic extruded tube have integral repetitive protuberances formed on its inner surface through plastic memory.

13. A continuous rod-like extrudate having spaced nodules formed thereon through plastic memory.

14. A continuous cylindrical extrudate having a series of equally spaced disc-like flanges formed integral with and projecting outwardly from the extrudate through plastic memory.

15. A continuous extruded tube having a conducting wire therein which wire is supported by a series of equally spaced disc-like flanges formed integral with and projecting inwardly from the inner surface of said extruded tube through plastic memory.

References Cited by the Examiner

UNITED STATES PATENTS

| | | | |
|---|---|---|---|
| 452,725 | 5/1891 | Williams | 174—28.2 |
| 1,087,443 | 2/1914 | Hallgreen | 138—118 |
| 2,288,899 | 7/1942 | Gits. | |
| 2,545,981 | 3/1951 | Warp | 161—123 X |
| 2,566,345 | 9/1951 | Joerren | 174—28.2 X |
| 2,620,397 | 12/1952 | Cork | 174—28.2 X |
| 2,622,623 | 12/1952 | Michaudet | 138—122 |
| 2,707,492 | 5/1955 | Harris et al. | 138—122 |
| 2,915,785 | 12/1959 | Valentini | 161—123 X |
| 2,968,835 | 1/1961 | Weston et al. | 18—12 |
| 2,979,768 | 4/1961 | Nichols | 18—12 |
| 3,023,483 | 3/1962 | Steiner | 161—179 X |
| 3,026,224 | 3/1962 | Rogers | 161—123 |
| 3,090,061 | 3/1963 | Charvat | 161—179 X |
| 3,100,658 | 8/1963 | Miller et al. | 161—123 X |

FOREIGN PATENTS

| | | |
|---|---|---|
| 761,000 | 12/1933 | France. |
| 835,291 | 9/1938 | France. |
| 1,019,783 | 11/1952 | France. |
| 1,166,668 | 6/1958 | France. |
| 777,340 | 6/1957 | Great Britain. |

OTHER REFERENCES

Charlesby A.: "How Radiation Affects Long Chain Polymers." In Nucleonics, vol. 12, No. 6, June 1954, pp. 18–25, page 19 relied upon.

Mason, J. P., and Manning, J. F.: "The Technology of Plastics and Resins," N.Y., Van Nostrand, 1945, p. 214, TP986, A2M3.

Schack, W.: "A Manual of Plastics and Resins," N.Y., Chemical Pub. Co., 1950, p. 149, 346, TP986, A2S34.

LAVERNE D. GEIGER, *Primary Examiner.*

EDWARD V. BENHAM, LEWIS J. LENNY, *Examiners.*

C. HOUCK, L. FOSTER, *Assistant Examiners.*